C. L. HOKE.
ALTIMETER.
APPLICATION FILED JAN. 17, 1917.
1,279,868.
Patented Sept. 24, 1918.
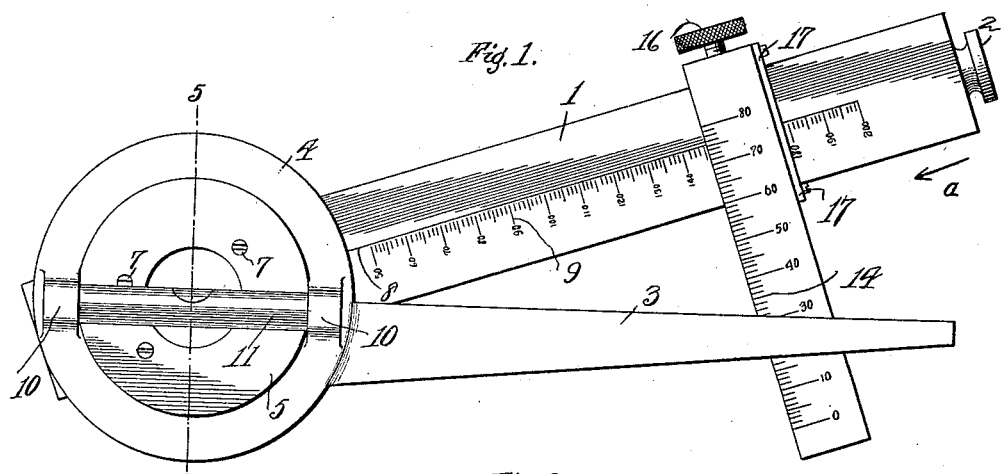
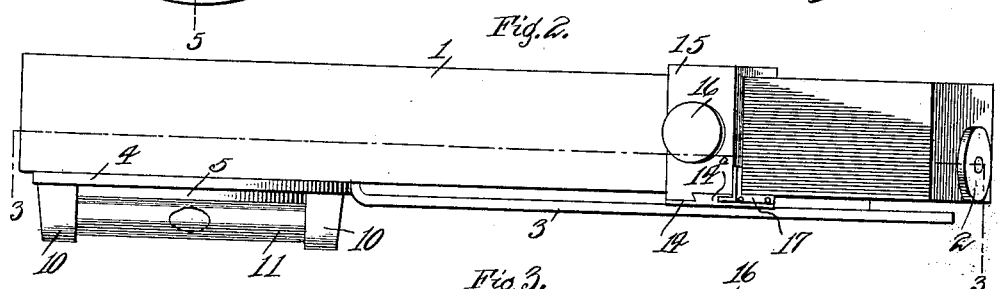
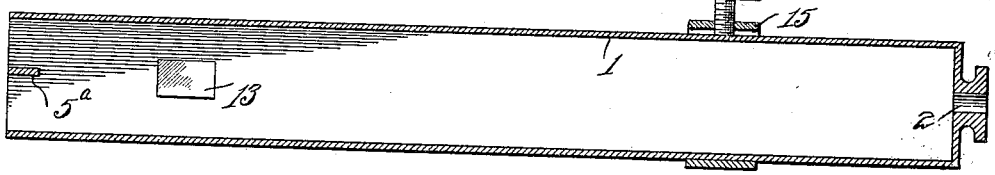
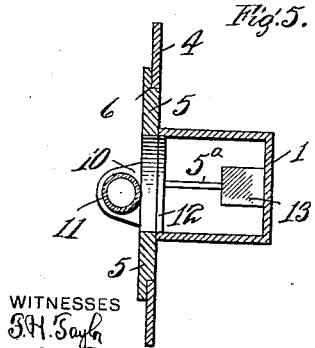
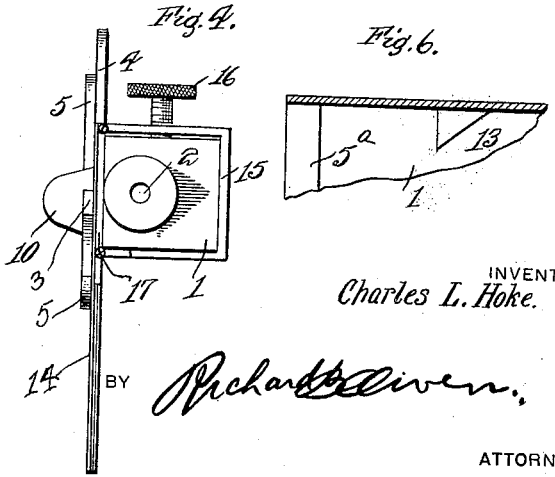
WITNESSES
INVENTOR
Charles L. Hoke.
BY
ATTORNEY

UNITED STATES PATENT OFFICE.

CHARLES L. HOKE, OF HARRISBURG, PENNSYLVANIA.

ALTIMETER.

1,279,868. Specification of Letters Patent. Patented Sept. 24, 1918.

Application filed January 17, 1917. Serial No. 142,895.

*To all whom it may concern:*

Be it known that I, CHARLES L. HOKE, a citizen of the United States, residing at Harrisburg, in the county of Dauphin and State of Pennsylvania, have invented certain new and useful Improvements in Altimeters, of which the following is a specification.

This invention relates to measuring instruments and is particularly concerned with that type of measuring instrument known as an altimeter which is designed to determine the altitude of objects.

It is known that similar devices of this character have been heretofore provided, but the various restrictions limit their use and render the calculations susceptible to error.

It is the object of the present invention to provide such an instrument that needs no supporting means and which may be held in the hand while being used, which can be used on any grade at any reasonable distance from the object, and from which the total height of the object can be read directly from one scale without requiring the adding or substracting of other readings. The object of the invention also contemplates such an instrument as may be used whether the observer is up or down hill relative to the object being measured.

This invention is particularly found useful in measuring telephone and telegraph poles, trees, grading, and for other similar purposes.

The feature of the invention resides in the novel construction, combination and arrangement of parts which will be later described as the detail description of the invention proceeds.

In the drawings which illustrate the construction of the instrument constituting the invention,—

Figure 1 is a side elevation of the altimeter according to the invention,

Fig. 2 is a top plan view of the invention as shown in Fig. 1,

Fig. 3 is a view taken substantially on line 3—3 of Fig. 2,

Fig. 4 is an end view of the invention looking in the direction of the arrow *a* indicated in Fig. 1, Fig. 5 is a vertical sectional view taken substantially on line 5—5 of Fig. 1, and Fig. 6 is a fragmentary sectional plan of the sighting tube.

Like characters denote similar and like parts throughout the specification and drawings.

Referring in detail to the drawings, 1 indicates a sighting tube, which may be of any preferred configuration in cross section, which is here shown as substantially rectangular, and has a peep-hole 2 through one end thereof and a sight 5$^a$ at the other end thereof arranged in longitudinal alinement with the peep-hole 2. A straight edge 3 having a ring 4 rigid at one end thereof is adapted to be pivotally connected to one end of the sighting tube 1, preferably by means of an annular member 5. The annular member 5 is provided with a circumferential rabbet 6 which is adapted to receive the inner periphery of the ring 4, said member 5 being secured to the end of the tube 1, opposite the peep-hole 2, by means of screws or other fastening members 7. The annular member 5 is so secured on the end of the tube 1 as to have the center thereof intersected by the scale-line 8 of the horizontal scale 9 provided on the sighting tube 1 for measuring horizontal distances, as will be later referred to. By so arranging the annular member 5 the apex of the angle formed by the tube 1 and the straight edge 3, will be at the center of said annular member 5. The ring 4 has projecting therefrom at diametrically opposite points, lugs 10 which are adapted to receive and support a spirit-level 11 in parallel relation with the straight edge 3.

To enable one to sight the spirit-level 11 while looking through the peep-hole 2, an opening 12 is provided in the sighting tube 1 and in alinement with the opening in the annular member 5; and a mirror 13 is angularly disposed in said sighting tube on the wall opposite the opening 12. It will thus be understood that as the user of the instrument is sighting an object through the tube 1 he can also ascertain, by a glance at the mirror 13, the position of the bubble in the spirit-level 11.

For coöperation with the horizontal distance measuring scale 9 and with the straight edge 3 is a vertical scale 14 which is slidably mounted, for vertical movement, in a sliding block 15 encompassing the sighting tube 1. The block 15 preferably consists of a frame rectangular in cross section having a thumb screw 16 threaded in the wall thereof to vertically engage with a wall of the sighting tube for adjustably retaining the frame upon the latter. Another wall of the frame 15 is suitably grooved to receive a correspondingly formed rib 14ᵃ longitudinally extending on the scale 14. A flat spring 17 is also carried by the block 15 for engaging in a groove in the scale 14 for retaining the scale in position and holding the same reasonably tight upon the block 15, however, permitting an easy slidable adjustment of the scale relative to said block. The scales 9 and 14 may be used or graduated according to any unit of measure, such as inches, feet, yards, kilometers, etc.

In using the altimeter as above described it is first necessary to know the distance between the points where the observation is to be taken and the object to be measured. When this is determined the block 15 is moved along the sighting tube so as to adjust the graduated edge of the scale 14 along the horizontal scale 9 to indicate this distance upon the horizontal scale, the block 15 being then secured in its position by tightening the thumb screw 16. Then by holding the sighting tube 1 in one hand and looking through the peep-hole 2 across the sight 5ᵃ to the bottom of the object to be measured (the ground line in the case of a pole or a tree) the other hand can move the straight edge 3 up or down until it can be seen in the mirror 13, that the bubble in the spirit level 11 is on the hair-line, usually provided on such levels. This is the end of the first sighting. Then leaving the straight edge 3 in its adjusted position the vertical scale 14 is to be adjusted until the zero mark intersects the straight edge 3; and assuming that the sighting has been taken on level ground and that it is five feet from the ground to the eye of the observer, the five mark on the vertical scale will coincide with the horizontal scale line 8, thus indicating that it is five feet from the ground to the eye of the observer. Then to complete the measuring of the object, the top of the object is sighted in the same manner as just described and during this sighting the straight edge 3 is moved upwardly until the mirror merely shows that the same is level, it being understood that the vertical scale is left in its adjusted position just described. Then the straight edge, as last adjusted, will indicate upon the vertical scale 14, the perpendicular height of the object measured from its bottom or ground line to its top.

It is to be understood that the present invention is not restricted to use upon level ground, as most of the devices of this character are, but may be used either up or down hill relative to the object to be measured. In the event that the observer stands below the base of the object to be measured and he wishes to ascertain, in addition to the height of the object to be measured, the difference in height between the point where he stands and the base or ground line of the object, this may be determined in the same manner as just described, as will be readily obvious.

It will be noted in applicant's invention that it is not necessary for the observer to stand on ground level with the object to be measured and that the instrument may be adjusted to measure the object at any reasonable distance therefrom instead of at a fixed distance which usually is inconvenient and sometimes impossible, and that no supporting means is necessary for the instrument.

The foregoing clearly describes my invention, however, it is to be understood that certain changes as to the specific construction, combination and arrangement of parts may be resorted to as fall within the legitimate scope of the appended claims.

What is claimed is:—

1. An altimeter of the class described comprising a sighting tube, a straight edge pivotally connected adjacent one end of the sighting tube, a leveling device carried by said straight edge, said sighting tube having an opening in a wall thereof, and a reflecting member disposed within said tube adjacent one wall thereof and arranged at an angle relative to said opening for reflecting the position of said leveling means to the eye of the observer while sighting through said tube.

2. An altimeter of the class described comprising a sighting tube, a straight edge pivotally connected adjacent one end of the sighting tube, a bubble level carried by said straight edge so that the bubble lies at the pivot center, said sighting tube having an opening in one wall thereof, a reflecting member disposed within said tube adjacent one wall thereof and arranged at an angle relative to said opening for reflecting the position of said leveling means to the eye of the observer during the sighting through said tube.

3. An altimeter of the class described comprising a sighting tube having a peep-opening at one end thereof, a sight at the other end thereof, a straight edge pivotally secured near one end of said sighting tube and having a spirit level mounted thereon so that the bubble lies at the axis of the pivot, said tube having an opening therein adjacent said spirit level, reflecting means in said tube adjacent one wall thereof and arranged at an angle relative to said opening for reflecting to the eye of the observer the position of the bubble of the level simultaneously with the sighting, and a scale carried by the sighting tube for coöperation with said straight edge and said sighting tube for indicating vertical distances.

4. An altimeter of the class described comprising a sighting tube having a peep-opening at one end thereof, a sight at the other end thereof, said tube being provided with a disk-like member near the sight end, said member having a central opening, a straight edge provided at one end with a ring adapted to encircle the disk of the sighting tube and having a spirit level mounted on one diameter of the ring and on one lateral face, said tube having an opening in one side thereof adjacent said spirit level, said tube opening alining with the opening in the disk-like member, reflecting means in said tube adjacent one wall thereof and arranged at an angle relative to the tube opening for reflecting to the eye of the observer the position of the level bubble during the sighting, a fixed scale on one side of said sighting tube, and a second scale slidably mounted on and extending at a right angle to the tube for coöperation with said horizontal scale to proportionately indicate horizontal distances, said second scale having another movement relative to said first movement for coöperation with said straight edge and said first scale for indicating vertical distances.

5. An altimeter, which comprises a hollow sighting tube having an eye piece at one end, the other end being open and having a sight bar placed transversely therein, said tube being provided with an opening in one side near said latter end, a disk provided with a central opening, said disk being secured to one side of the tube so that the tube opening will register with disk opening, a ring slidably mounted on the periphery of the disk, laterally projecting lugs serving to receive a bubble level so that the bubble will lie at the center of the disk and ring, a leveling arm secured to the ring and offset therefrom and adapted to move in a plane parallel to the tube, the upper edge of said arm being and extended on one diameter of the ring, said sight tube having on one side a scale extending longitudinally and placed intermediate the edges of said side, an arm slidably mounted on the tube to project at a right angle therefrom, said latter arm being provided with graduations on one edge to coöperate with the upper edge of the leveling arm, and means for simultaneously viewing the position of the bubble when sighting upon an object.

In testimony whereof I affix my signature in presence of two witnesses.

CHARLES L. HOKE.

Witnesses:
  CLOYD C. HOLLAND,
  L. C. WURATIS.

Copies of this patent may be obtained for five cents each, by addressing the "Commissioner of Patents, Washington, D. C."